United States Patent
Papke et al.

(10) Patent No.: US 9,771,967 B2
(45) Date of Patent: Sep. 26, 2017

(54) CONTROL CABLE SYSTEM INCORPORATING STABILIZER GUIDE

(71) Applicant: Exmark Manufacturing Company, Incorporated, Beatrice, NE (US)

(72) Inventors: Clark S. Papke, Cortland, NE (US); Gary L. Nicholson, Beatrice, NE (US)

(73) Assignee: EXMARK MANUFACTURING COMPANY, INCORPORATED, Beatrice, NE (US)

( * ) Notice: Subject to any disclaimer, the term of this patent is extended or adjusted under 35 U.S.C. 154(b) by 177 days.

(21) Appl. No.: 14/875,861

(22) Filed: Oct. 6, 2015

(65) Prior Publication Data

US 2017/0094890 A1    Apr. 6, 2017

(51) Int. Cl.
| | |
|---|---|
| *A01C 17/00* | (2006.01) |
| *F16C 1/10* | (2006.01) |
| *B05B 12/00* | (2006.01) |
| *A01C 7/08* | (2006.01) |
| *E01C 19/20* | (2006.01) |
| *F16C 1/16* | (2006.01) |

(52) U.S. Cl.
CPC ............. *F16C 1/102* (2013.01); *A01C 7/085* (2013.01); *A01C 17/006* (2013.01); *B05B 12/00* (2013.01); *B05B 12/002* (2013.01); *E01C 19/20* (2013.01); *E01C 19/203* (2013.01); *F16C 1/10* (2013.01); *F16C 1/16* (2013.01)

(58) Field of Classification Search
CPC ....... B05B 12/00; B05B 12/002; E01C 19/20; E01C 19/203; A01B 76/00; A01C 7/085; A01C 17/006; F16C 1/02; F16C 1/10; F16C 1/16; F16C 1/102

USPC .............. 239/650, 669, 681, 684, 687, 578; 74/500.5, 501.6, 502, 502.6, 503
See application file for complete search history.

(56) References Cited

U.S. PATENT DOCUMENTS

| | | | |
|---|---|---|---|
| 4,402,438 A * | 9/1983 | Gregory ................ | A01C 15/02 239/687 |
| 4,487,370 A | 12/1984 | Speicher | |
| 4,548,362 A | 10/1985 | Doering | |
| D282,931 S | 3/1986 | Doering et al. | |
| 4,624,195 A | 11/1986 | Doering | |
| 4,867,381 A | 9/1989 | Speicher | |
| 5,000,059 A * | 3/1991 | Barnard ................... | F16C 1/12 74/501.6 |
| 5,137,106 A | 8/1992 | Allen et al. | |
| 5,333,795 A | 8/1994 | Jessen | |
| 5,361,988 A | 11/1994 | Nelson | |
| 6,135,036 A | 10/2000 | Speicher, III et al. | |

(Continued)

OTHER PUBLICATIONS

U.S. Appl. No. 14/698,061, filed Apr. 28, 2015, Papke.

(Continued)

*Primary Examiner* — Steven J Ganey
(74) *Attorney, Agent, or Firm* — Mueting, Raasch & Gebhardt, P.A.

(57) ABSTRACT

A push-pull cable system including a cable assembly, a stabilizing element, and a guide member. The stabilizing element and guide member may maintain alignment of a wire of the cable assembly as it pushes against a mechanism resistive force that is not aligned with the wire itself. As a result, the cable system may be utilized in applications wherein space constraints prevent alignment of the wire with the resistive force vector of the mechanism.

20 Claims, 9 Drawing Sheets

(56) References Cited

U.S. PATENT DOCUMENTS

| | | |
|---|---|---|
| 6,336,600 B1 | 1/2002 | Jessen |
| 6,932,287 B2 | 8/2005 | Kost et al. |
| 7,063,280 B1 | 6/2006 | Bogart et al. |
| 7,954,573 B2 | 6/2011 | Jessen |
| 8,056,828 B1 | 11/2011 | Kline et al. |
| 8,056,838 B2 * | 11/2011 | Conner ............ A01C 17/006 239/681 |
| 8,074,904 B1 | 12/2011 | Hobbs |
| 8,474,735 B2 | 7/2013 | Hobbs, Jr. et al. |
| 8,632,018 B2 | 1/2014 | Kline et al. |
| 2010/0200680 A1 | 8/2010 | Hobbs, Jr. et al. |
| 2014/0131465 A1 | 5/2014 | Kline et al. |

OTHER PUBLICATIONS

U.S. Appl. No. 29/525,222, filed Apr. 28, 2015, Nicholson et al.
U.S. Appl. No. 14/697,909, filed Apr. 28, 2015, Cook et al.
"100 lb ATV Spreader" Info Sheet [online]. Buyers Products Co. Archive dated Mar. 12, 2014 [retrieved Sep. 8, 2015]. Retrieved from the Internet: <URL: https://web.archive.org/20140312225058/http://www.buyersproducts.com/Spreaders/ATV-Spreaders/100-lb-ATV-Spreader/14>; 1 page.
"Installation Instructions: ATVS100 ATV Spreader" [online]. Buyers Products Co., Date Unknown [retrieved on Sep. 8, 2015]. Retrieved from the Internet: <URL: http://www.buyersproducts.com/Common/Documents/3011654_C.pdf>; 4 pages.
"Cub Cadet Commercial Offers 3-in-1 Stand-on Spreader/Sprayer: Application Landscapers Get Productivity Boost with Granular, Liquid, and Spot-Spray Capability in One Machine" [online]. Oct. 23, 2008 [retrieved on Jun. 23, 2015]. Retrieved from the Internet: <URL: http://newsroom.cubcadet.com/newsroom/article/new-articlepage-17#images>; 2 pages.
"Cub Cadet Commercial, Hydrostatic Stand-On Self-Propelled Spreader-Sprayer: Operator's Manual;" Form #769-04150 Rev. 09-0, Cub Cadet LLC, Cleveland, Ohio, Nov. 12, 2008; 20 pages.
"EarthWay EV-N-SPRED, Operation and Assembly Manual for the M30 12-volt ATV Broadcast Spreader." Form 9-2014 Part #52195. EarthWay Products, Inc., Bristol, Indiana. Sep. 2014, 6 pages.
"Ground Logic—Go for a Joyride," web page [online]. Ground Logic, Inc. Archive dated May 17, 2014, copyright 2011 [retrieved on Jun. 23, 2015]. Retrieved from the Internet: <URL: https://web.archive.org/web/20140517085448/http://groundlogicinc.com/>; 1 page.
"2015 Ground Logic—Premium Commercial Spreading & Spraying Equipment," Sales Brochure. Ground Logic Inc., Lincoln, Nebraska, 4 pages.
"L.T. Rich Products, Inc.—Owners Manual—JR36R / ZS-3620R Z-Spray," Owners Manual. Available at least as early as Jul. 1, 2015. L.T. Rich Products, Inc., Lebanon, Indiana, 27 pages.
"Commercial Sprayers, Seeders, & Aerators—Indiana—Z-Spray," web page [online]. L.T. Rich Products, Inc. Copyright 2015 [retrieved on Jun. 23, 2015]. Retrieved from the Internet: <URL: www.z-spray.com/z-spray-sprayers/>; 3 pages.
"L.T. Rich Products: JR-36R," web page [online]. Jan. 15, 2013 [retrieved on Jun. 23, 2015]. Retrieved from the Internet: <URL: http://landscapemanagement.net/l-t-rich-products-jr-36r>; 2 pages.
"PermaGreen Triumph Spreader Sprayer Operator's Manual." Operator's Manual, North American Version (v12). Perma-Green Supreme, Inc. Feb. 9, 2010; 45 pages.
"PermaGreen Triumph Spreader Sprayer Operator's Manual: Model C1C with Serial No. 14151 and above." Operator's Manual, North American Version (v15). Perma-Green Supreme, Inc. Nov. 9, 2014; 44 pages.
"PermaGreen: It's Your Future," Sales Brochure. Perma-Green Supreme, Inc. Copyright 2014; 12 pages.
"R57200 Spread-N-Spray: TurfEx's RS7200 Spread-N-Spray isn't just a spreader/sprayer combination . . . It's the most efficient way to care for turf," Brochure. Trynex International. Copyright 2012; 2 pages.
"RS7200E Spread-N-Spray: The New RS7200E Spread-N-Spray," Brochure. Trynex International. Copyright 2013; 2 pages.

\* cited by examiner

CONTROL CABLE SYSTEM INCORPORATING STABILIZER GUIDE

Embodiments described herein are directed generally to cable systems and, in particular, to push-pull cable systems incorporating a cable wire stabilizer.

BACKGROUND

Turf maintenance equipment such as lawn mowers, ride-on material spreader/sprayers, and the like are known. This sort of equipment often includes mechanically operated subsystems that are actuated by push-pull cables. In general, a push-pull cable is a device adapted to displace a movable member by remotely applying a pushing and/or pulling force via a cable wire sliding within a cable housing. The cable wire is connected both to the movable member as well as to a remote actuator, and the cable housing is typically secured to structure at or near each of its ends.

While push-pull cables have proven to be more than adequate for many applications, drawbacks exist. For example, when pushing and pulling against a resistive mechanical load having an axis that is offset from an axis of the cable wire, an eccentric load may be imparted to the cable wire. If such forces are sufficiently high, the cable wire may deflect (e.g., bow outwardly) from the desired axial direction and thereby fail to provide the intended translational displacement of the movable member.

SUMMARY

Embodiments described herein may provide a control cable system including a movable member and a cable housing, the housing having: a first end secured to a structure; and a remote second end. A wire is slidably received within the cable housing, wherein the wire defines a first end portion that extends outwardly beyond the first end of the cable housing, the first end portion of the wire being connected to the movable member at an attachment point. The system also includes: an elongate stabilizing element also connected to the movable member; and a guide member secured to the structure, wherein the guide member defines an aperture adapted to slidably receive the stabilizing element therein.

In another embodiment, a control cable system is provided that includes a cable housing having a first end secured to a structure, and a wire slidably received within the cable housing. The wire defines a first end portion that extends outwardly beyond the first end of the cable housing to terminate at a wire end. An elongate stabilizing element is also provided and operatively attached to the wire end, the stabilizing element defining an axis coaxial with an axis of the first end portion of the wire. A link is connected to the first end portion of the wire at a location between the stabilizing element and the first end of the cable housing. A guide member is secured to the structure and spaced-apart from the first end of the cable housing. The guide member defines an aperture adapted to slidably receive the stabilizing element therein with clearance.

In yet another embodiment, A powered turf maintenance vehicle is provided that includes: a chassis supported by two or more wheels; a prime mover adapted to provide driving power to at least one of the two or more wheels; a turf maintenance apparatus attached to the chassis; an actuator adapted to manipulate the turf maintenance apparatus between at least a first condition and a second condition; and a control cable system mechanically connecting the actuator to the turf maintenance apparatus. The control cable system includes a movable member and a cable housing, the housing having: a first end secured to a structure; and a remote second end. A wire is slidably received within the cable housing, wherein the wire defines a first end portion that extends outwardly beyond the first end of the cable housing, the first end portion of the wire being connected to the movable member at an attachment point. The system further includes: an elongate stabilizing element also connected to the movable member; and a guide member secured to the structure. The guide member defines an aperture adapted to slidably receive the stabilizing element therein.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
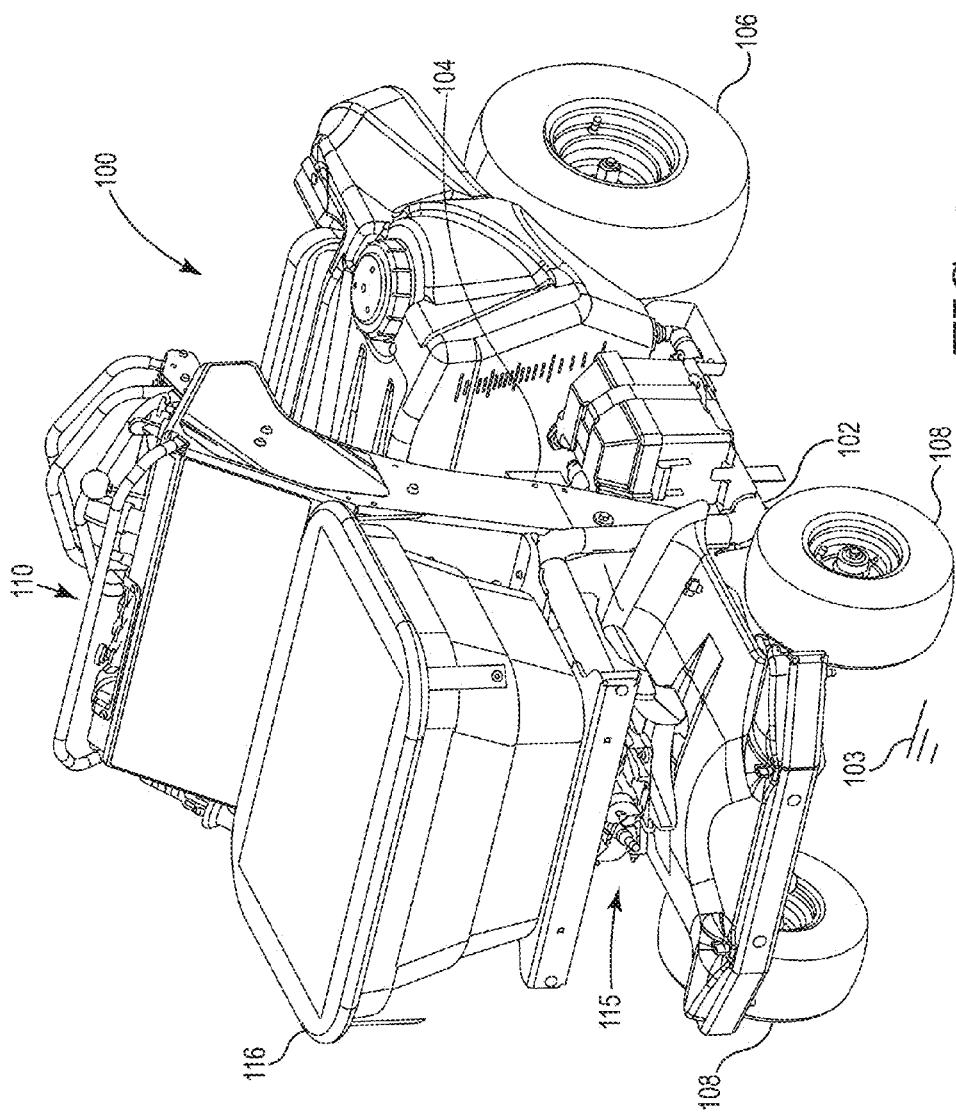
FIG. 1 is a perspective view of an exemplary turf maintenance vehicle having a turf maintenance apparatus (e.g., a material spreader/sprayer) incorporating a control cable system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Moreover, "Figure x" and "FIG. x" may be used interchangeably herein to refer to the accompanying figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly possible.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally speaking, embodiments of the present disclosure are directed to a control (e.g., push-pull) cable system for remotely displacing a movable member. The push-pull cable system may include a control cable assembly having a wire slidably received within a cable housing, the latter which is secured to structure (e.g., a chassis) at one or both ends. A first end portion of the wire may be attached to the movable member, while a remote second end of the wire is attached to an actuating or control member. Accordingly, the movable member may be remotely displaced by movement of the control member via the cable assembly.

The cable system may, in addition to the cable assembly, further include a guide member adapted to maintain alignment of the wire even when the resisting force of the movable member is not aligned with an axis of the wire. In one embodiment, the guide member may interact with a stabilizing element, the latter being attached to the movable member or to the wire. For example, the stabilizing element may form an elongate member that is received within an aperture formed in the guide member. As a result, the stabilizing element may slide within the guide member, effectively maintaining wire alignment (e.g., resist deflection of the wire) even when the resisting force of the movable member is offset from the wire axis. In one embodiment described herein, the guide member and stabilizing element may be located beyond a point where the wire attaches to the movable member. Accordingly, an axis of the aperture of the guide member may be generally coaxial with an axis of the stabilizing element and with an axis of the first end portion of the wire. Such a configuration is, however, not limiting as other relative positions of the guide member/stabilizing element are certainly possible.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of the particular figure (e.g., while the reference vehicle is positioned such that its wheels rest upon a generally horizontal ground surface 103 as shown in FIG. 1). These terms are used only to simplify the description, however, and not to limit the interpretation of any embodiment described.

For purposes of description only, the exemplary control cable system will be described with reference to a powered turf maintenance vehicle incorporating a turf maintenance apparatus. In particular, the exemplary embodiments described herein illustrate a broadcast spreader diffuser mechanism forming part of a dedicated material spreader/sprayer vehicle 100 as illustrated in FIG. 1. While the general construction of the vehicle 100 is not central to an understanding of exemplary embodiments (e.g., control cable systems in accordance with embodiments of the present disclosure may find application to most any mechanical system), the exemplary diffuser and its related structure are briefly described below.

With reference to the figures of the drawing, wherein like reference numerals designate like parts and assemblies throughout the several views, FIG. 1 illustrates the exemplary spreader/sprayer vehicle 100. The vehicle 100 may include a frame or chassis 102 that supports a prime mover (e.g., internal combustion engine 104). One or more, e.g., left and right ground-engaging drive members (e.g., rear drive wheels 106 (only left wheel visible)) may be coupled to left and right sides, respectively, of the chassis 102 and support a rear portion of the chassis during vehicle operation. Each drive wheel 106 may be powered by the prime mover 104 to rotate, relative to the chassis 102, about a fixed axis such that one or both drive wheels may propel the vehicle 100 over the ground surface 103. Front steerable wheels 108 may also be provided to support a front portion of the vehicle upon the ground surface. While described herein as an internal combustion engine, other embodiments could utilize other prime movers (e.g., an electrical power source) to power the drive wheels 106. Moreover, while illustrated as wheels 106, other embodiments may utilize other drive members (e.g., tracks or the like), or other drive configurations (e.g., front-wheel or all-wheel drive) without departing from the scope of this disclosure.

The vehicle 100 may, as shown in FIG. 1, also include a control station 110 having one or more vehicle controls located thereon. The control station 110 may be conveniently accessible by an operator located upon an operator station, e.g., a standing platform (not shown) mounted near a rear side of the chassis 102. Such an exemplary platform is illustrated in more detail in co-pending U.S. application Ser. No. 14/697,909 filed Apr. 28, 2015, which is incorporated herein by reference in its entirety.

Figure 6:
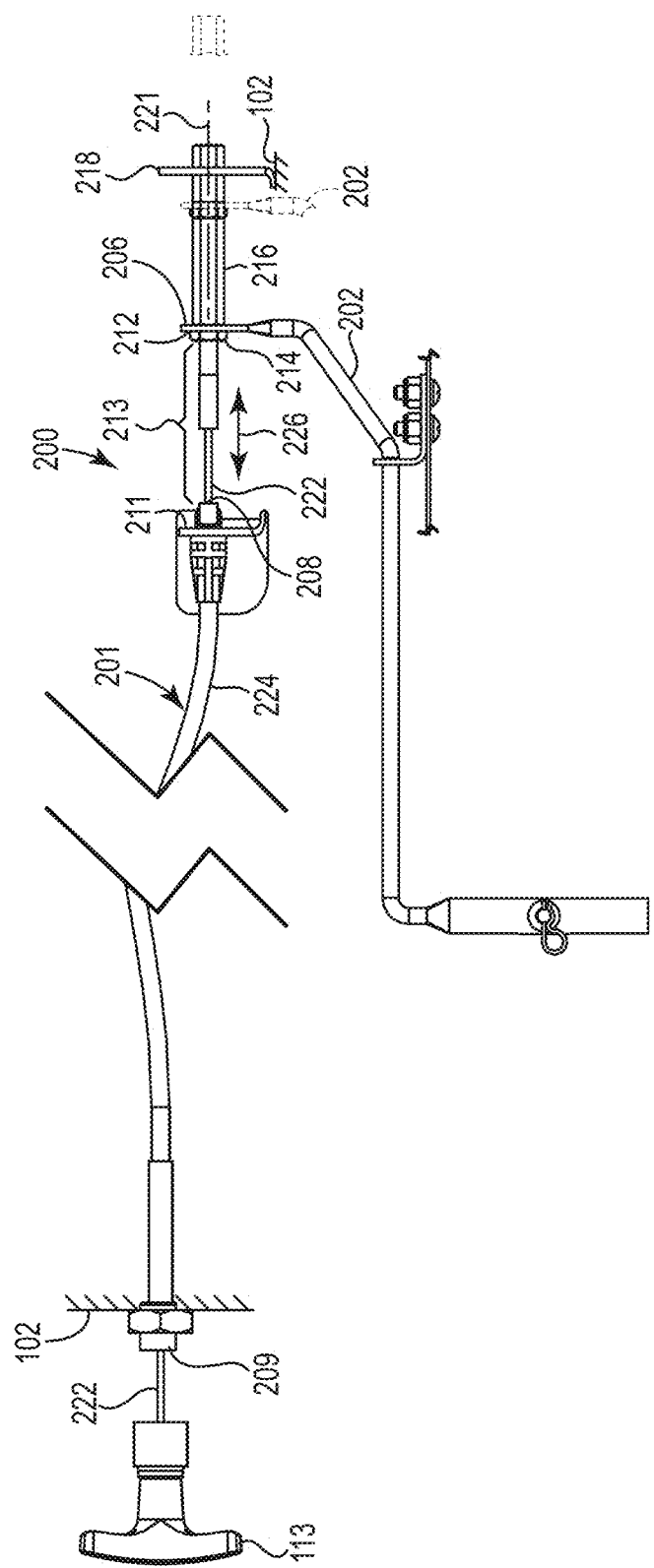
FIG. 6 is a diagrammatic view of the control cable system of FIG. 3.

The control station 110 may include controls adapted to manipulate various systems of the vehicle including, for example: engine throttle setting and ignition; parking brake; and controls for a front-mounted broadcast spreader 115 fed by a hopper 116. For example, the controls may include one or more actuators (e.g., handle 113 as shown in FIG. 6) operable to control a diffuser 118 (see, e.g., FIG. 3) for the broadcast spreader 115. Other controls may also be provided to permit control of other aspects of the spreader 115 (e.g., a gate 125 (see FIG. 7) that controls the size of a material opening 120 (see also FIG. 3) of the hopper 116), but such controls/aspects are not further described herein.

Figure 2:
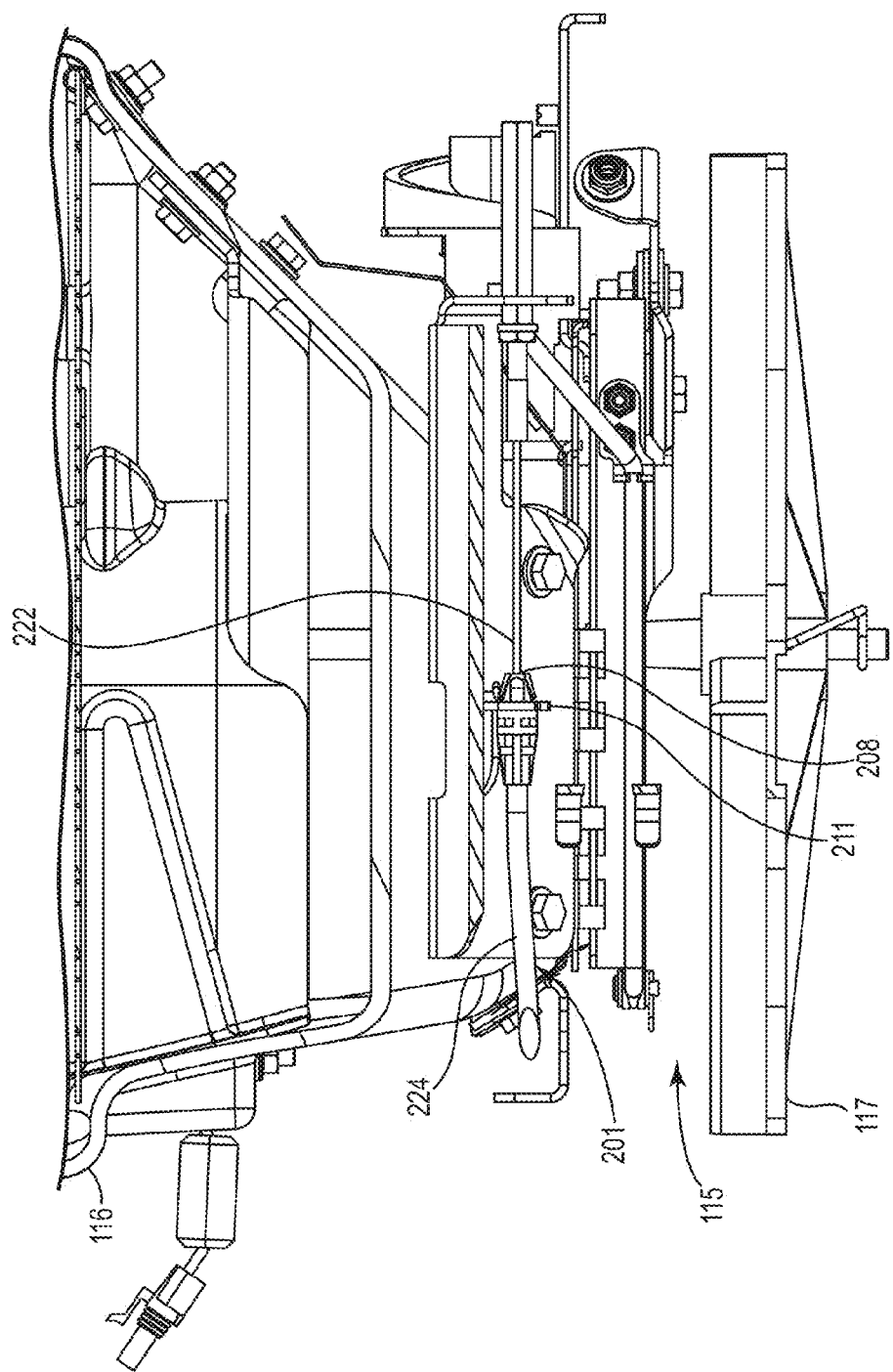
FIG. 2 illustrates an exemplary material hopper, usable with the spreader/sprayer of FIG. 1, in a partial side section view, wherein a control cable system in accordance with embodiments of the present disclosure is shown for use in controlling a broadcast spreader diffuser.
Figure 3:
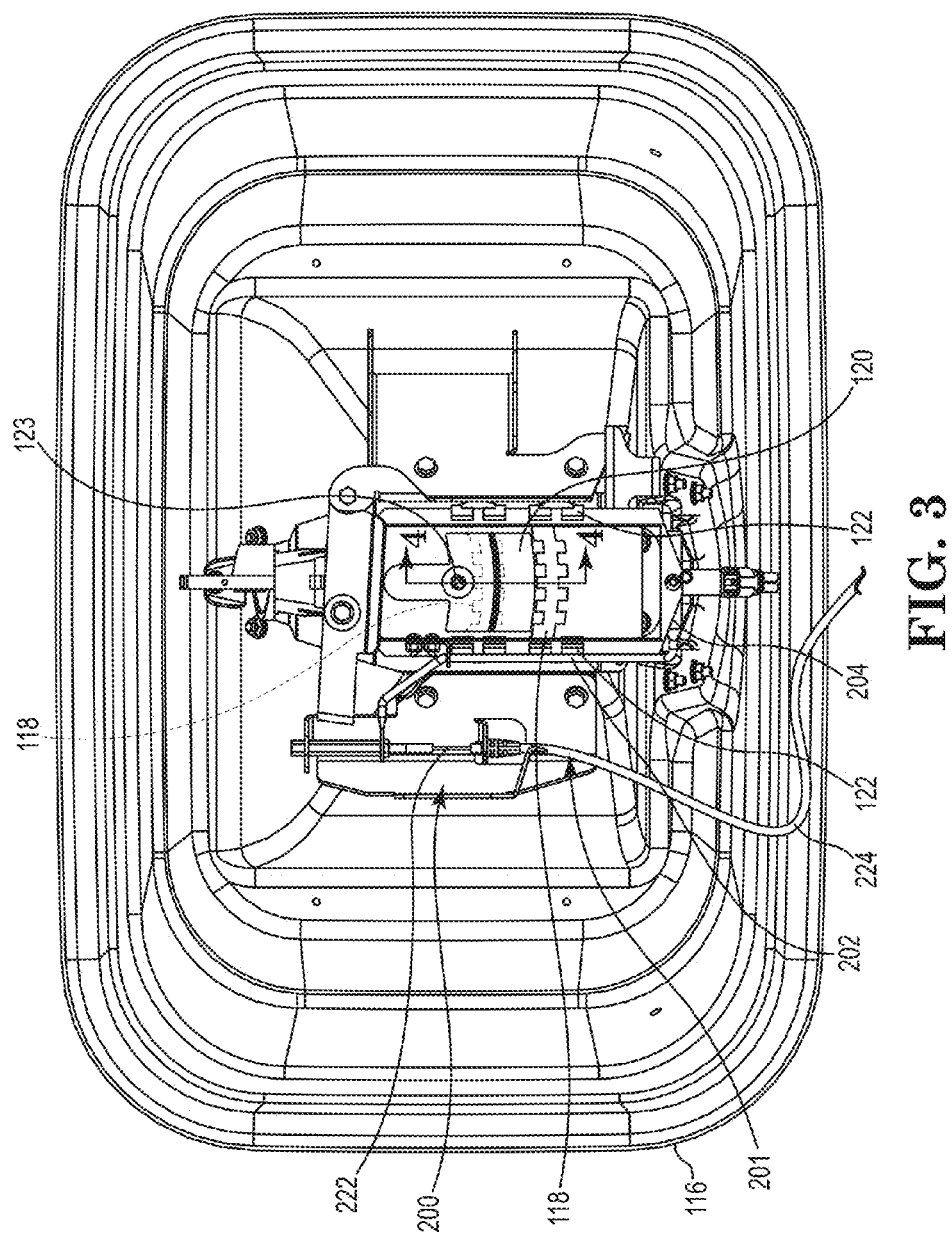
FIG. 3 is a partial (e.g., spinner removed) bottom plan view of the hopper of FIG. 2 illustrating the diffuser and corresponding control cable system in accordance with embodiments of the present disclosure.

The spreader 115 may include a rotating spinner 117 as shown in the partial section view of FIG. 2. The spinner 117 is adapted to distribute a granular material (e.g., turf fertilizer, seed, ice control materials, etc.) received, via gravity, from the hopper 116 through the opening 120 (FIG. 3). Once again, the size of the opening 120 may be controlled by a gate as is known in the art.

Figure 4:
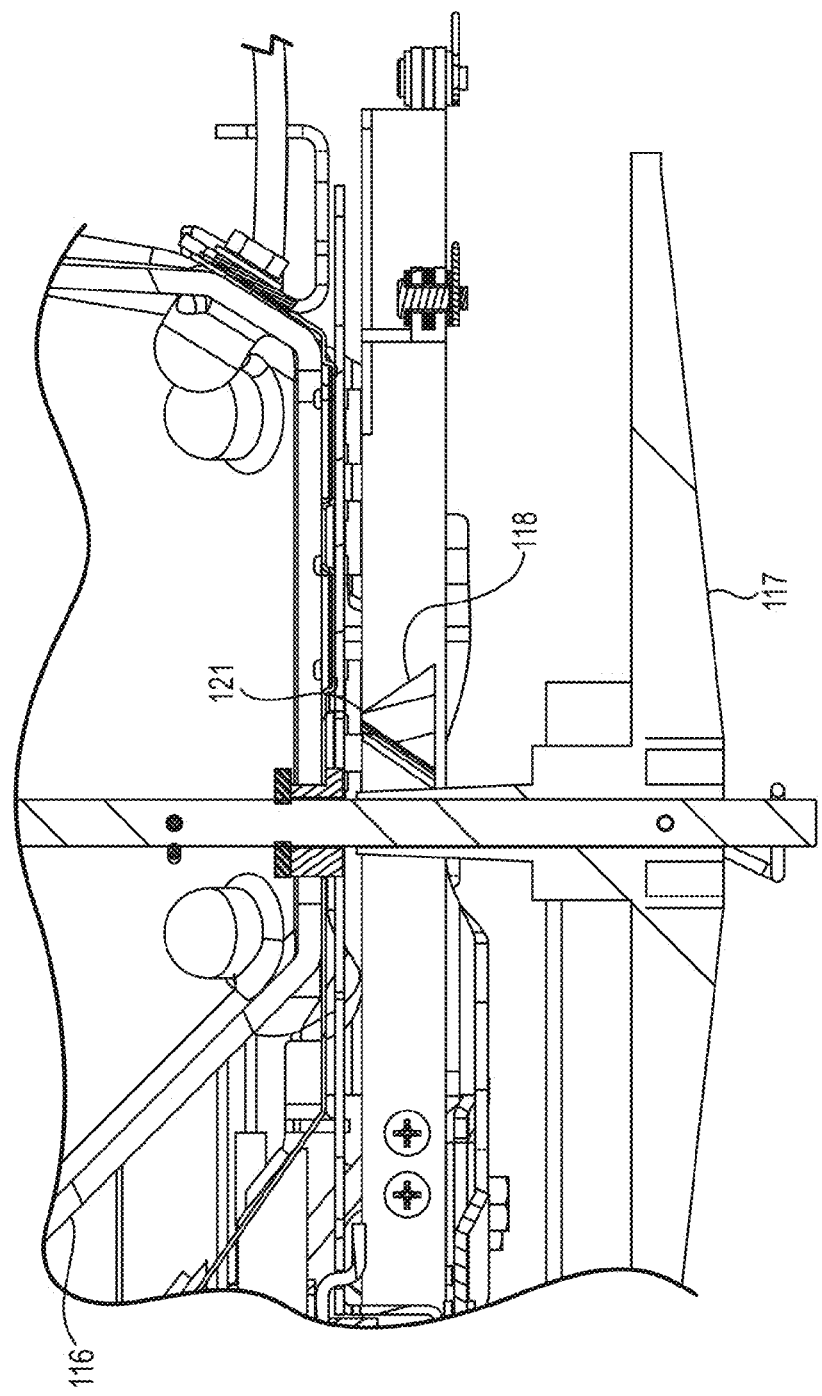
FIG. 4 is a rotated section view of the diffuser taken along line 4-4 of FIG. 3 with the spinner shown attached.

In order to control the placement of the granular material from the hopper onto the rotating spinner 117 (e.g., such control may advantageously influence material dispersion characteristics), the diffuser 118, an example of which is shown in FIG. 3 (spinner not shown in this view), may be provided. In one embodiment, the diffuser 118 may form an inverted V-shaped member (with its apex 121 pointing upwardly) as shown in the rotated cross-sectional view of FIG. 4. The diffuser 118 may be linearly translated along rails 122 (see FIG. 3) located along a bottom surface of the hopper 116 so that the diffuser location, relative to the opening 120 (and to an axis of rotation 123 of the rotating spinner 117), may be altered. As a result, the radial placement of granular material onto the spinner 117 may be controlled or otherwise influenced by movement of the diffuser 118.

Figure 5A:
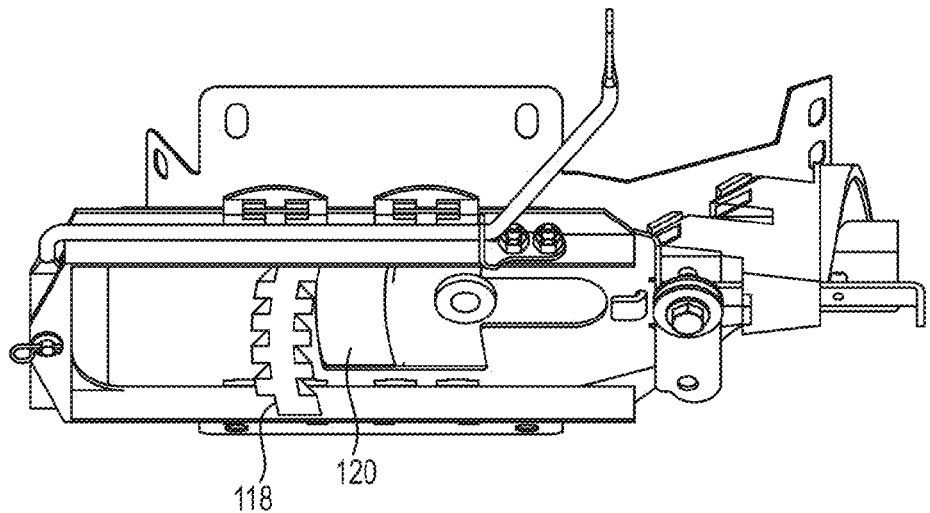
FIG. 5A is a bottom perspective view of the diffuser, with some structure removed, showing a gate of the hopper open and the diffuser in a first position.
Figure 5B:
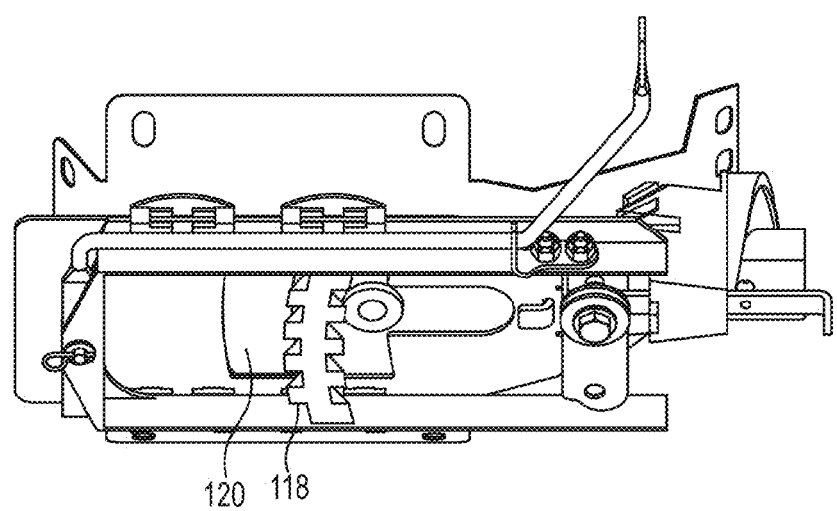
FIG. 5B is a bottom perspective view like FIG. 5A, showing the gate of the hopper open but with the diffuser shown in a second position.
Figure 7:
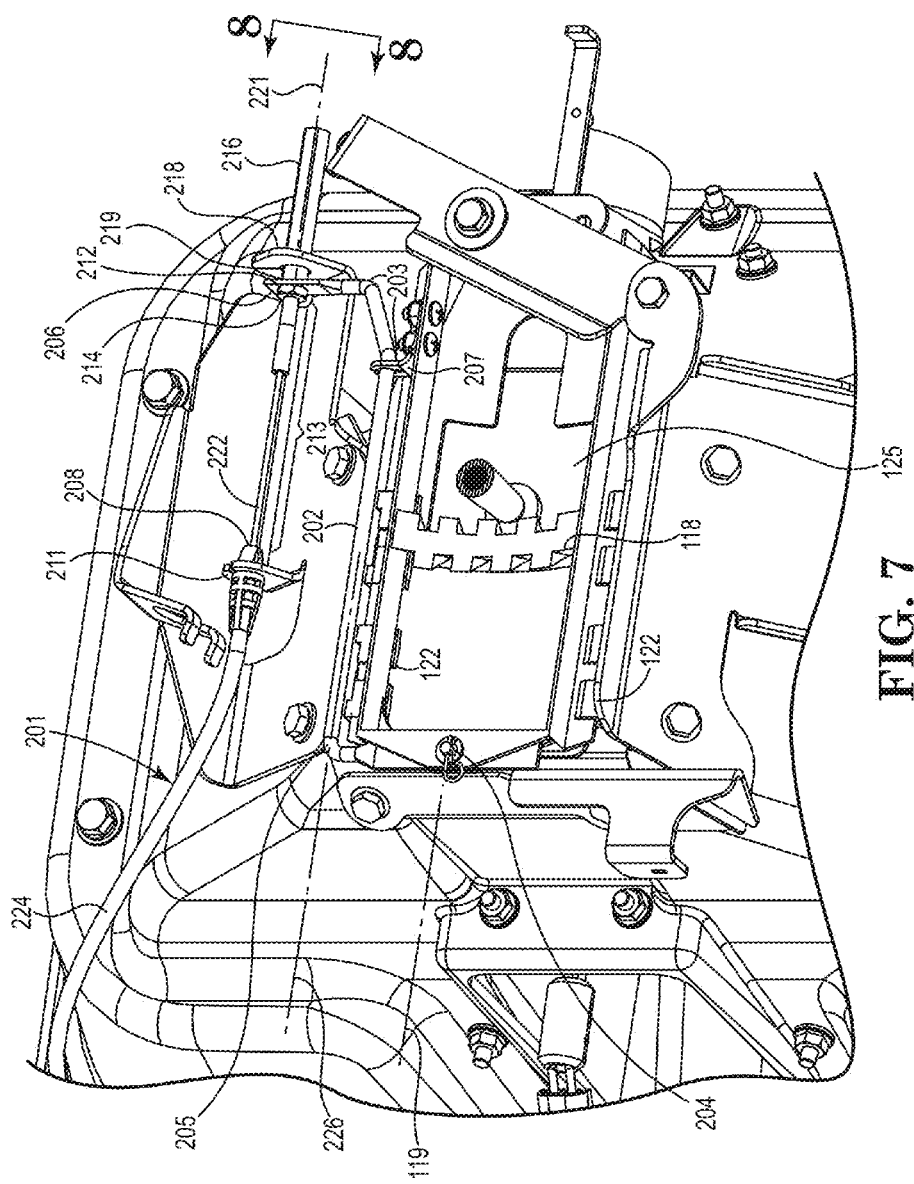
FIG. 7 is an enlarged partial bottom perspective view of the diffuser and control cable system of FIG. 3.

To better illustrate the diffuser's role in material dispersion from the hopper 116 onto the spinner 117, FIGS. 5A and 5B illustrate partial lower perspective views of the hopper when the gate is open and the diffuser 118 is positioned: in a first position more toward the outer edge of the opening 120 (FIG. 5A); and a second position more toward the inner edge of the opening 120 (FIG. 5B). As is evident in these views, the angular shape of the diffuser 118 (see FIG. 4) may direct granular material more toward the center of the spinner 117 when positioned as shown in FIG. 5A, and more toward the outer edge of the spinner when positioned as shown in FIG. 5B. Once again, independent of the diffuser, the gate 125 may be selectively positioned to completely close the opening 120 when desired as is shown in FIG. 7.

To translate the diffuser 118 along the rails 122, the vehicle 100 may include a push-pull control cable system 200 as shown in FIGS. 3 and 6 (the control cable system 200 is shown detached from the remainder of the vehicle 100 in FIG. 6). The cable system 200 may include a flexible cable assembly 201 having a wire 222 that is slidably received within a cable housing 224. As shown in FIG. 6, the wire 222 may include a first end portion 213 that extends outwardly beyond a first or proximal end 208 of the housing 224. The proximal end 208 of (as well as other locations along) the housing 224 may be secured to (e.g., relative to) structure (e.g., relative to the chassis 102) via an anchor 211. The wire 222 may also extend outwardly beyond a second or distal end 209 of the housing 224, such that a second or distal end of the wire may connect to an actuator or control member (e.g., the handle 113). By manipulation of the control member (e.g., by pushing/pulling the handle 113), the first end portion 213 of the wire 222 may be forced to extend from, or retract toward, the proximal end 208 of the housing 224 as represented by arrows 226. That is to say, the control handle 113, via the control cable assembly 201, may manipulate the first end portion 213 of the wire 222, and thus the diffuser 218, between at least the first position as shown in FIG. 5A (e.g., corresponding to a first condition or setting of the spreader 115) and the second position as shown in FIG. 5B (e.g., corresponding to a second condition or setting of the spreader). The handle 113 may, in some embodiments, include a locking feature (e.g., twist to lock/unlock mechanism).

As used herein, the term "wire" 222 may include most any solid- or multi-strand wire-core element, while the term "housing" 224 may include most any compatible sleeve or wire enclosure that permits relative movement of the wire.

The wire 222 (e.g., the first end portion 213) may define an attachment point 212 configured to operatively connect to a movable member 202 (described in more detail below). In one embodiment, the attachment point 212 may be formed by a terminal wire end of the first end portion 213 of the wire and be located between an elongate stabilizing element 216 (also described in more detail below) and the proximal end 208 of the cable housing 224. While various configurations are possible, the attachment point 212 may be formed by threads formed on the wire end (e.g., a threaded end crimped to the wire end) and one or more jam nuts 214 engaged with such threads.

As further shown in FIG. 6, the cable system 200 may also include the elongate stabilizing element 216. The stabilizing element may be attached to the movable member 202 and/or to the first end portion 213. For example, the stabilizing element 216 may also attach (e.g., thread) to the wire end and be tightened against the jam nut(s) 214. In such a configuration, an axis of the stabilizing element 216 may be coaxial with an axis 221 of the first end portion 213 of the wire 222.

With reference now to FIG. 7, the movable member 202 may, in the illustrated embodiment, be a wire form link having a second end 204 operatively connected to the diffuser 118, and a first end 206 connected to the first end portion 213 of the wire 222 at the attachment point 212. As shown in this view, the wire 222 and the housing 224 may form the push-pull cable assembly 201 that is used to actuate (e.g., translate) the diffuser 118 along the rails 122. However, due to physical space constraints in the vicinity of the diffuser 118, it is not feasible to route the cable assembly 201 such that the longitudinal axis 221 of the proximal end portion 213 of the wire 222 aligns with a push-pull axis 119 of the diffuser. Rather, the axis 119 is offset from the axis 221 as shown in FIG. 7. The resulting link/movable member 202, therefore, includes various bends 203, 205 between the diffuser 218 and the wire 222. One or more brackets 207 may be provided (e.g., attached for displacement with the diffuser 218) to constrain movement of the movable member 202 to that corresponding to the desired translation of the diffuser 118, e.g., along an axis parallel to, but offset from, the axis 221 of the first end portion 213 of the wire 222. As a result of this construction, the movable member/link may define a load path axis 226 that is offset from (or, alternatively, intersects with), the axis 221 of the first end portion 213 of the wire 222.

As one can appreciate, a conventional push-pull cable could present problems when utilized in an application like that shown in the illustrations. In particular, the wire 222 may excessively deflect when pulling/pushing against the movable member 202 as the force vector resisting the wire's pulling/pushing force is not coaxial with the axis 221 of the first end portion 213.

To address this issue, cable systems in accordance with embodiments of the present disclosure may include not only the push-pull cable assembly 201, but also a stabilizing assembly that includes the stabilizing element 216 and a guide member 218, an embodiment of which is shown in FIGS. 6 and 7. In the illustrated embodiment, the guide member 218 is formed by a bracket secured to structure (e.g., to the hopper 116) and is spaced-apart from the proximal end 208 of the cable housing 224. The guide member 218 may further form an aperture 219 defining an axis that is, in the illustrated embodiments, generally coaxial with the axis 221 of the first end portion 213 of the wire 222. The aperture may be adapted to slidably receive the stabilizing element 216 therein with clearance. Moreover, the stabilizing element 216 may be designed such that it is retained within the aperture 219 of the guide member 218 when the wire 222 is in a first retracted position (solid lines in FIG. 6), a second extended position (broken lines in FIG. 6), and any position in-between, i.e., the stabilizing element may remain captured within the aperture 219 over the entire stroke of the wire.

In one embodiment, the aperture 219 may have a shape that is complimentary to a cross-sectional shape of the stabilizing element 216. As used herein, "complimentary" shape indicates that the shape and size of the aperture and the cross-sectional shape and size of the stabilizing element are such that the latter may translate freely within, but be generally constrained against all but axial translation by, the former. For example, the aperture may have a circular shape adapted to receive a stabilizing element of circular cross-section. Alternatively, the aperture (or the stabilizing element) could have one or more flats formed on its inner surface (or on the outer surface of the stabilizing element) as further described herein. Regardless of the actual shape, the aperture 219 may have an effective diameter that is slightly larger than the effective diameter of the stabilizing element 216 so that the stabilizing element 216 may slide within the aperture without binding. To assist with translation of the stabilizing element, one or both of the stabilizing element and inner surfaces of the aperture 219 may be lubricated or incorporate some other type of friction-reducing bushing or coating.

As used herein, "effective diameter" refers to the largest cross-sectional dimension for a male component (e.g., the stabilizing element 216), or the smallest cross sectional dimension for a female component (e.g., the aperture 219), regardless of whether or not the actual cross sectional shape is circular. Of course, embodiments wherein one of the stabilizing element 216 and the aperture 219 includes a key (e.g., of any geometric profile) received within a corresponding keyway of the other of the stabilizing element and aperture are also contemplated. In such configurations, the effective diameter is understood to refer to nominal dimensions of the parts that will allow the desired translational movement.

By maintaining alignment of the wire 222, e.g., between the anchor 211 and the guide member 218, the wire (and thus the attachment point 212) is held in alignment as it is advanced, from the housing 224, against the resistive force of the movable member 202. As a result, any tendency of the wire 222 to buckle or deflect as a result of the off-center load on the wire 222 is counteracted by the constraining effect of the stabilizing element 216/guide member 218. As one can appreciate, a configuration like the embodiments described herein may also reduce the couple created by the offset axes (221, 119; see FIG. 7), thereby minimizing binding of the diffuser 118 as it slides along the rails 122.

Figure 8:
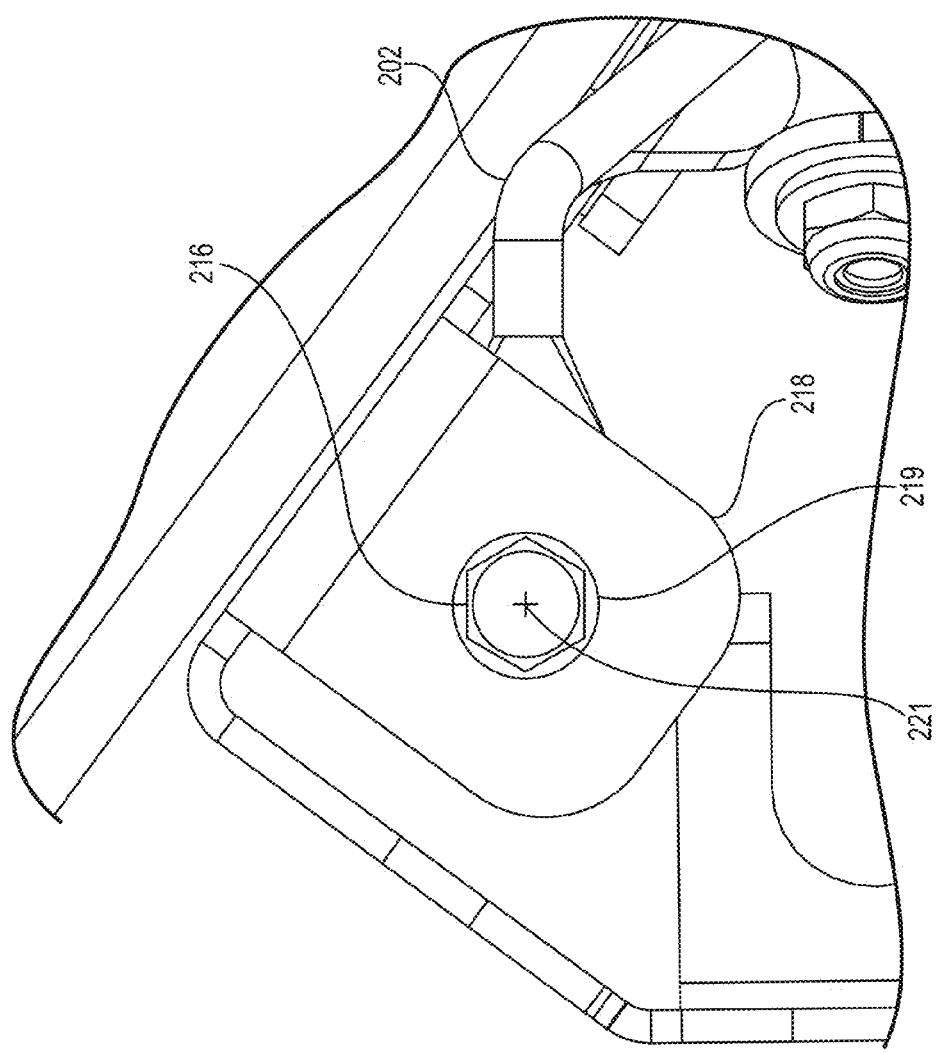
FIG. 8 is a partial end view of a guide member and stabilizing element of the control cable system of FIG. 7 taken along line 8-8 of FIG. 7.

FIG. 8 illustrates an end view of the stabilizing element 216 taken along line 8-8 of FIG. 7 (e.g., looking parallel to the axis 221). As shown in this view, the aperture 219 may, in one embodiment, be circular in shape, while the stabilizing element 216 has one or more flats formed thereon, e.g., a polygonal cross-sectional shape. For instance, the illustrated stabilizing element 216 is shown as having a hexagonal cross-sectional shape. By providing a hexagonal cross section (or another cross section having diametrically opposed flats), the stabilizing element 216 may be easily gripped with a wrench or the like to tighten to the wire 222 during manufacture/maintenance.

Moreover, the hexagonal cross-section shape of the stabilizing element 216 may provide other benefits. For example, it may prevent full surface contact between the stabilizing element 216 and the aperture 219 inner surface as may exist, for example, with a round stabilizing element and round aperture. Such a configuration may beneficially reduce potential maintenance issues resulting from the granular materials "gumming up" when exposed to moisture.

Figure 9:
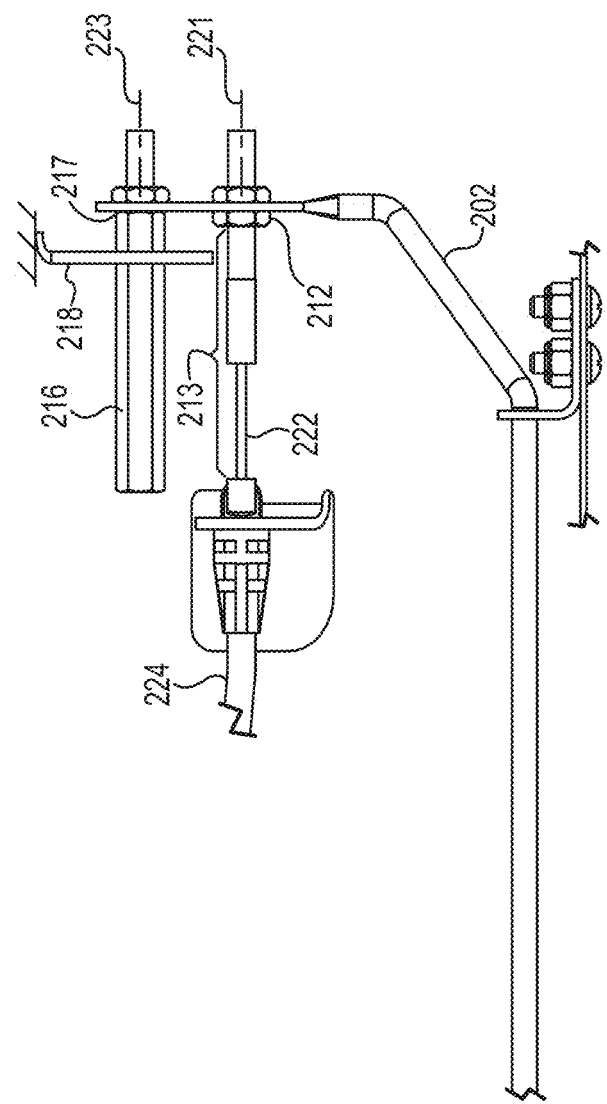
FIG. 9 is a partial diagrammatic view of a control cable system in accordance with another embodiment of the disclosure.

While the embodiments illustrated in FIGS. 3-8 provide a stabilizing element 216 having an axis that is coaxial with the axis 221 of the first end portion 213 of the wire 222, such a configuration is not limiting. For example, in other embodiments, the first end portion 213 of the wire 222 could connect to the movable member 202 at the attachment point 212, while the stabilizing element 216 could attach to the movable member at a separate attachment point 217 offset from the first attachment point as shown in FIG. 9 (the remaining portions of the system shown in FIG. 9 are similar or identical to the like components already described herein and, as such, are not further described). The stabilizing element 216 would again extend outwardly from the movable member. However, by being offset from the axis 221, the stabilizing element could now extend to either side of the movable member 202 (e.g., extend from the right side of the movable member as shown in FIG. 6, or extend from the left side (e.g., toward the proximal end of the housing 224) as shown in FIG. 9). By providing a stabilizing element 216 that extends from the left side of the movable member 202 as shown in FIG. 9, a more compact cable system may be provided. Of course, the stabilizing element 216 of the system shown in FIG. 9, unlike that of FIG. 6, would have an axis 223 that, while parallel, is not coaxial, with the axis 221 of the first end portion 213 of the wire 222.

Advantageously, cable systems in accordance with embodiments of the present disclosure may accommodate push-pull cable configurations in applications where alignment of the cable wire with the resisting mechanical load is not possible, e.g., due to space constraints, while still providing desirable wire pushing capability.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A control cable system comprising:
   a movable member;
   a cable housing comprising: a first end secured to a structure; and a remote second end;
   a wire slidably received within the cable housing, the wire defining a first end portion that extends outwardly beyond the first end of the cable housing, the first end portion of the wire connected to the movable member at an attachment point;
   an elongate stabilizing element also connected to the movable member; and
   a guide member secured to the structure, the guide member defining an aperture adapted to slidably receive the stabilizing element therein.

2. The system of claim 1, wherein an axis of the stabilizing element is parallel with an axis of the first end portion of the wire.

3. The system of claim 1, wherein an axis of the stabilizing element is coaxial with an axis of the first end portion of the wire.

4. The system of claim 1, wherein an axis of the aperture is coaxial with an axis of the first end portion of the wire.

5. The system of claim 1, wherein the stabilizing element has a polygonal cross-sectional shape.

6. The system of claim 1, wherein the aperture has a circular shape and the stabilizing element has a polygonal cross-sectional shape.

7. The system of claim 6, wherein the polygonal cross-sectional shape comprises a hexagonal cross-sectional shape.

8. The system of claim 1, wherein the movable member comprises a link having a first end attached to the wire at the attachment point.

9. The system of claim 8, wherein the link defines a load path axis that is offset from an axis of the first end portion of the wire.

10. The system of claim 1, wherein the wire is movable, relative to the cable housing, between a first retracted position and a second extended position, and wherein the stabilizing element is retained within the aperture of the guide member when the wire is in the first retracted position, the second extended position, and any position in-between.

11. A control cable system comprising:
a cable housing comprising a first end secured to a structure;
a wire slidably received within the cable housing, the wire defining a first end portion that extends outwardly beyond the first end of the cable housing to terminate at a wire end;
an elongate stabilizing element operatively attached to the wire end, the stabilizing element defining an axis coaxial with an axis of the first end portion of the wire;
a link connected to the first end portion of the wire at a location between the stabilizing element and the first end of the cable housing; and
a guide member secured to the structure and spaced-apart from the first end of the cable housing, the guide member defining an aperture adapted to slidably receive the stabilizing element therein with clearance.

12. The system of claim 11, wherein the aperture defines an axis coaxial with the axis of the first end portion of the wire.

13. The system of claim 11, wherein the aperture has a circular shape and the stabilizing element has a polygonal cross-sectional shape.

14. The system of claim 13, wherein the polygonal cross-sectional shape comprises a hexagonal cross-sectional shape.

15. The system of claim 11, wherein the link comprises a wire form member constrained for movement along an axis parallel to, but offset from, the axis of the first end portion of the wire.

16. A powered turf maintenance vehicle comprising:
a chassis supported by two or more wheels;
a prime mover adapted to provide driving power to at least one of the two or more wheels;
a turf maintenance apparatus attached to the chassis;
an actuator adapted to manipulate the turf maintenance apparatus between at least a first condition and a second condition; and
a control cable system mechanically connecting the actuator to the turf maintenance apparatus, the control cable system comprising:
a movable member;
a cable housing comprising: a first end secured to a structure; and a remote second end;
a wire slidably received within the cable housing, the wire defining a first end portion that extends outwardly beyond the first end of the cable housing, the first end portion of the wire connected to the movable member at an attachment point;
an elongate stabilizing element also connected to the movable member; and
a guide member secured to the structure, the guide member defining an aperture adapted to slidably receive the stabilizing element therein.

17. The vehicle of claim 16, wherein the turf maintenance apparatus comprises a broadcast spreader.

18. The vehicle of claim 16, wherein the movable member is connected to a diffuser for a broadcast spreader, the diffuser movable between a first position corresponding to the first condition of the turf maintenance apparatus, and a second position corresponding to the second condition of the turf maintenance apparatus.

19. The vehicle of claim 16, wherein the aperture has a circular shape and the stabilizing element has a hexagonal cross-sectional shape.

20. The vehicle of claim 16, wherein the movable member defines a load path axis that intersects, or is offset from, an axis of the first end portion of the wire.

* * * * *